Nov. 27, 1956

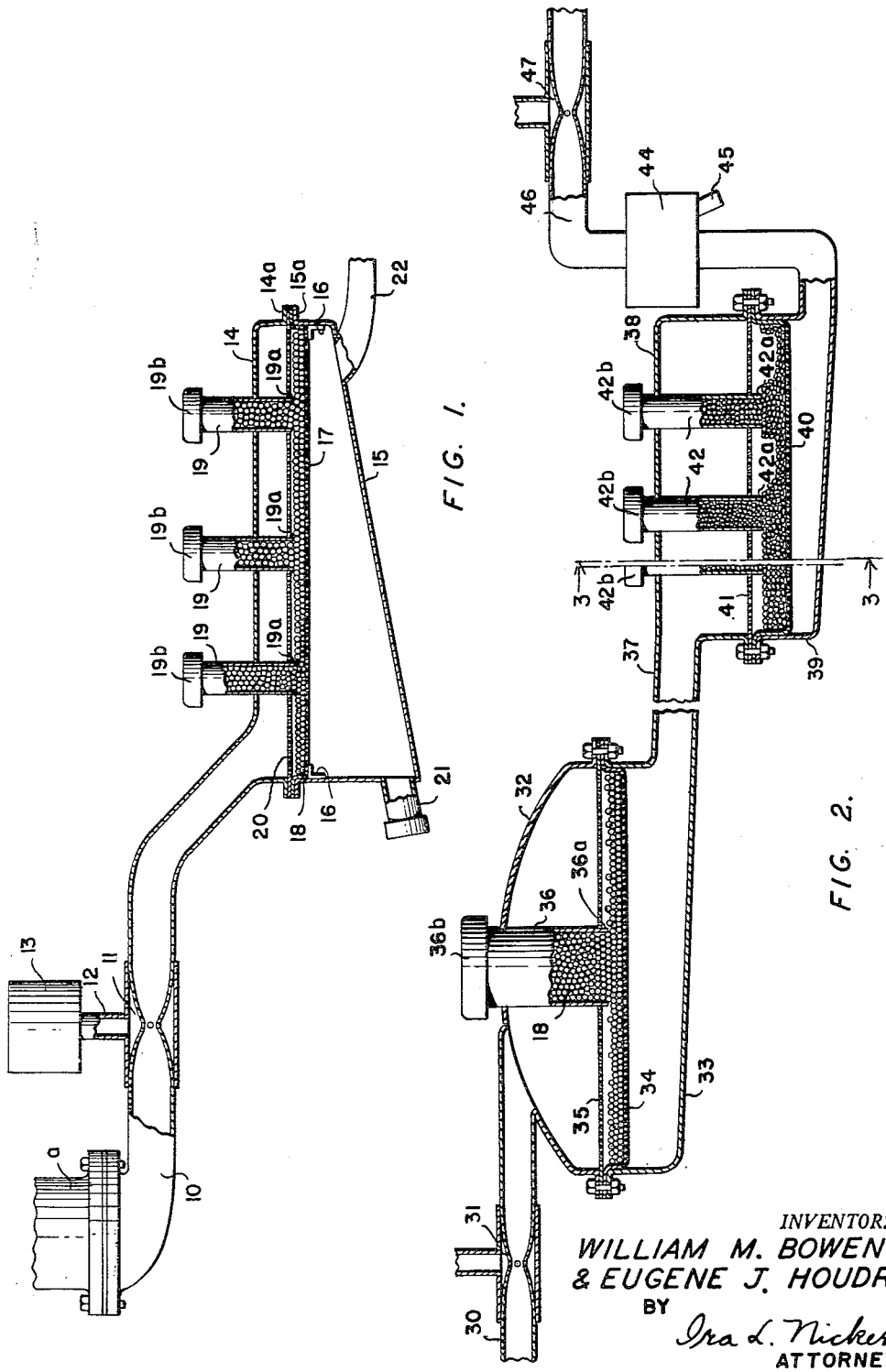

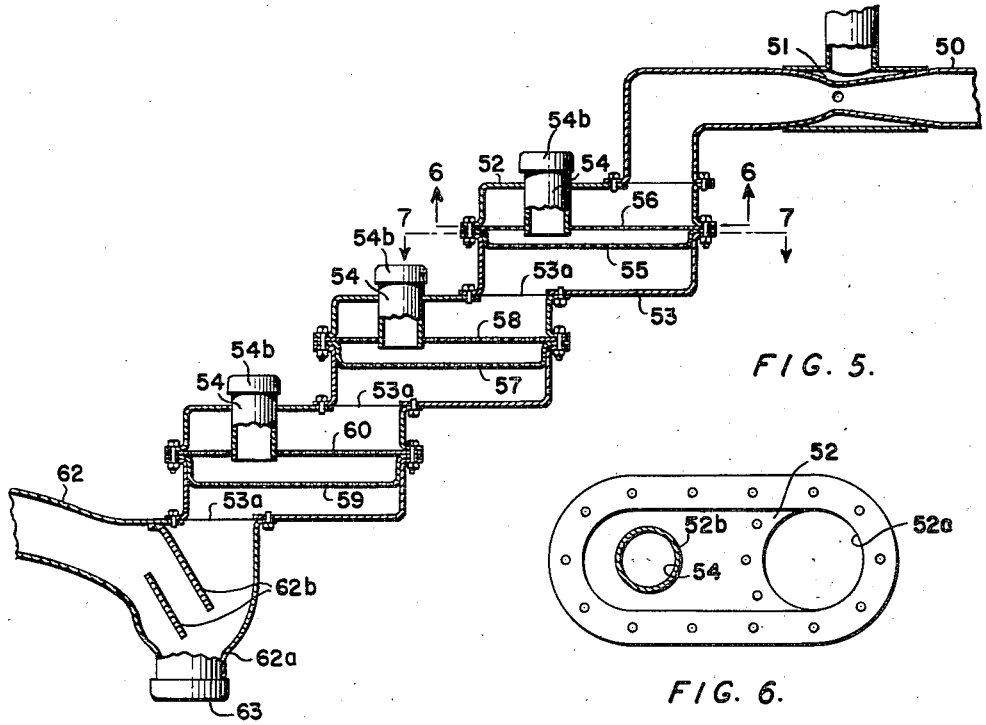
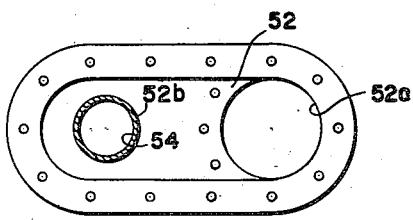
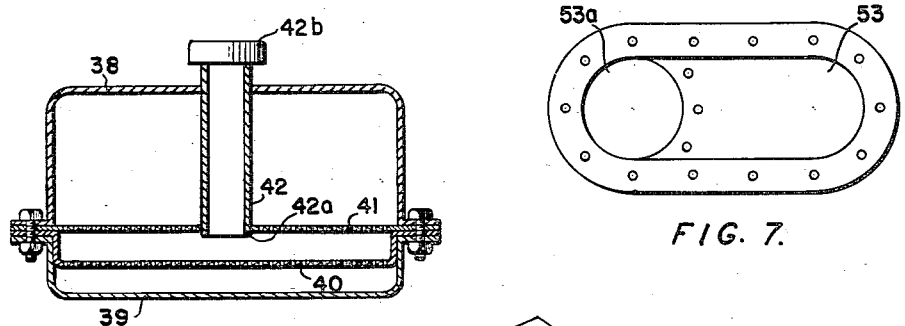
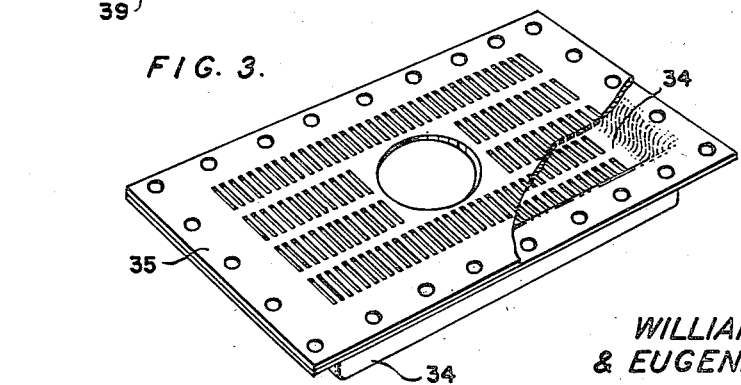

W. M. BOWEN III, ET AL 2,772,147

EXHAUST GAS TREATING UNIT

Filed April 6, 1951

INVENTORS
WILLIAM M. BOWEN III
& EUGENE J. HOUDRY
BY
Ira L. Nickerson
ATTORNEY

United States Patent Office 2,772,147
Patented Nov. 27, 1956

2,772,147

EXHAUST GAS TREATING UNIT

William M. Bowen III, Chester, and Eugene J. Houdry, Ardmore, Pa., assignors, by direct and mesne assignments, to Oxy-Catalyst, Inc., a corporation of Pennsylvania Application April 6, 1951, Serial No. 219,623

5 Claims. (Cl. 23—288)

This invention relates to catalysis and to catalytic operations utilizing catalysts in discrete form, as bits, fragments, pellets or molded pieces. More particularly it has to do with catalytic operations of the surface type in which there is a tendency or at least a possibility that the activity of the catalytic mass will be reduced or otherwise impaired by the accumulation of a deposit of foreign matter, poisonous or merely enveloping, on the active surfaces of the catalyst.

Deposits on the catalyst may come from a number of sources. Foreign matter may be present in gaseous or in solid form in the reactants. Condensation may wash dirt and particles of metal or other substances from adjacent parts of the equipment upon the catalyst. Certain products of the reaction may form deposits directly on the catalyst or through over exposure to the action of the catalyst. In the catalytic transformation of hydrocarbons coke is ordinarily deposited on the catalyst and such coke is removed periodically, usually by burning, in a regenerating operation.

It is a principal object of the invention to conduct a catalytic operation continuously and without the necessity of stopping periodically to restore the catalyst to activity. Another object is to free the surface of the catalyst of deposits which have a tendency to adhere thereto. Another object is to establish catalyst in discrete or pellet form in a zone in which a predetermined depth of catalyst is maintained. Another object is to feed additional catalyst to the zone as required. Another object is to avoid tight packing of the catalyst and possible rupture of equipment due to close packing and temperature variations. Another object is to effect intermittent or continuous movement and rubbing of the catalyst pieces against each other and against adjacent walls so as to free the pieces of deposits and/or to present new catalytic surfaces thereby to promote the reaction in a continuous manner and at a substantially uniform rate of conversion. Still another object is to segregate the solid particles from the fluids leaving the catalytic zone so that substances of value can be recovered therefrom. Still another object is to control the rate and manner of heat liberation in exothermic reactions. Still other objects will be apparent from the detailed description which follows.

In accordance with the present invention the catalyst in discrete or pellet form is arranged in a layer of predetermined thickness upon an apertured support or grid which is maintained in horizontal position. The support is subjected to slight but rather rapid movement so that the mass of catalyst is caused to vibrate or dance on the support, the individual pieces turning and rubbing against one another and against the support so that their surfaces are freed of deposits in a substantially continuous manner. The reactants are passed through the catalytic zone while the catalytic mass is in a state of agitation. By preference additional pieces of catalyst are fed from a hopper to the layer as required to maintain the layer at predetermined depth, and the spacing of the outlet of the hopper from the support determines the depth of the layer of catalyst. By preference a second grid is disposed in spaced relation to the apertured support and slightly above the outlet of the hopper to define a catalytic zone which is never completely filled with catalyst. The desired reaction may be effected in stages through the use of two or more catalytic zones. Solid particles or fines leaving the catalytic zone or zones may be trapped, or suitably separated out as by centrifugal action.

In order to illustrate the invention in both process and apparatus aspects concrete forms of apparatus for practicing the same are shown in the accompanying drawings, in which:

Fig. 1 is a side elevational view partly in section of an apparatus providing a single catalytic zone;

Fig. 2 is a similar view, also partly in elevation and partly in section of a modification having two catalytic zones;

Fig. 3 is a transverse sectional view substantially on the line 3—3 of Fig. 2, the catalyst being omitted;

Fig. 4 is a perspective view partly cut away of the catalytic chamber for the first zone of Fig. 2, catalyst and hopper therefor being omitted;

Fig. 5 is a vertical sectional view of a modification having three catalytic zones of progressively increasing catalyst depth arranged in cascade, the catalyst being omitted;

Figs. 6 and 7 are respectively plan views on an enlarged scale of the complementary shell parts for one of the sections shown in Fig. 5 before assembly, as viewed upwardly and downwardly from line 7–6—6–7 of Fig. 5, with the grids of the catalyst chamber omitted;

Figure 8:
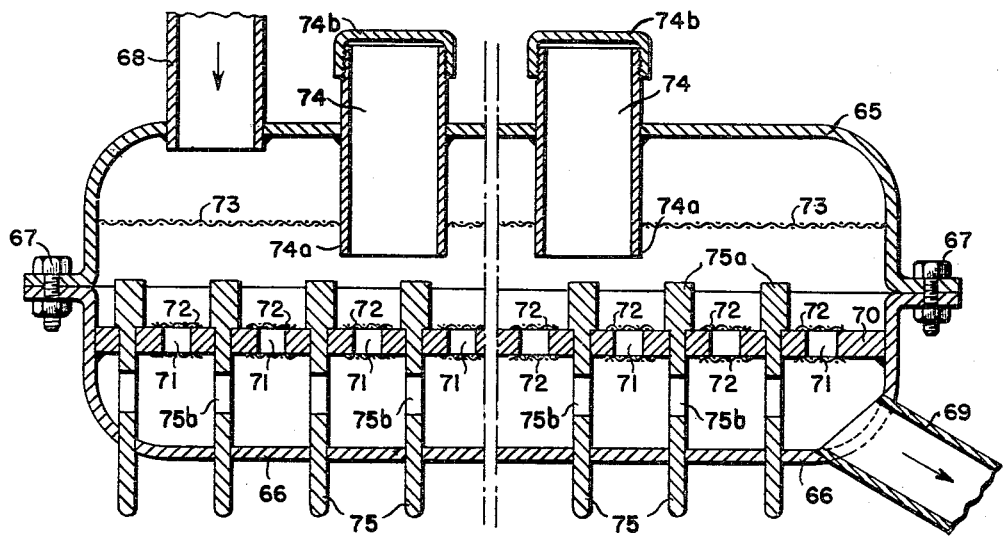
Fig. 8 is a longitudinal vertical sectional view on an enlarged scale of a modified catalytic converter having heat dissipating fins.

By way of illustration catalytic apparatus for conducting oxidizing operations is shown, specifically for effecting flameless oxidation or burning of inflammable components in fumes resulting from incomplete combustion of fuel. The specific apparatus illustrated is for the purpose of rendering non-poisonous and odorless the exhaust fumes from internal combustion engines. The apparatus shown in Fig. 1 utilizes a single catalytic zone of substantial extent and is designed to take the place of the conventional muffler for such engines. In Fig. 1, a is the flanged end of the exhaust manifold of the engine to which is suitably attached, as by bolts, a conduit 10 which at one point is formed with a venturi 11 to draw fresh air into the conduit, fresh air being supplied by a pipe 12, the inlet of which is provided with an air filter 13. Conduit 10 leads to a muffler casing formed in two parts 14 and 15 provided with flanges 14a and 15a respectively, by which the parts may be secured together. Just below the flange 15a, lower part 15 is provided on its interior with brackets 16 supporting an apertured or perforated grid 17 forming the bottom wall or support for oxidizing catalist 18 in discrete or pellet form which is fed to the support from a series of hoppers 19 extending through and above the upper part 14 of the muffler casing and provided with closure caps 19b as shown. The lower open end 19a of each of the hoppers is spaced a predetermined distance above support 17, thereby determining the depth of the layer of catalyst which is formed across support 17. Under the vibratory movement of the muffler when the engine is in operation, catalyst 18 will flow downwardly and outwardly from hoppers 19 and spread over support 17 in an even layer, but since the catalyst is in solid particles or pellets, the depth of this layer will be limited substantially to the spacing of the hopper outlets 19a above support 17. An upper perforated member or grid is by preference positioned slightly above the open ends 19a of hoppers 19 to form the top wall of the catalyst chamber. Such an upper wall or grid is shown at 20 in Fig. 1 and in the form illustrated is of sufficient lateral extent to be clamped between flanges 14a and 15a of the upper and lower parts 14 and 15 making up the muffler casing. The depth of the catalyst chamber provided by lower support 17 and upper grid 20 is normally in the range of one-half inch to two inches and the open ends 19a of feed hoppers 19 will extend at least one-eighth of an inch below upper grid 20. The shallower the layer of catalyst the less back pressure upon the engine, but the greater the depth of catalyst the more surface area of catalyst is available for oxidizing the burnable components in the exhaust gases. In operation the vibration of the engine causes the catalyst particles or pellets to move rapidly in a state of partial suspension, appearing to dance on and above apertured support 17, turning and rubbing against each other and against any adjacent wall so that their surfaces are kept clear of deposits of all kinds and a clean catalytic surface is presented to the fumes or other reactants passing through the bed of catalyst. Even with very dense and hard catalytic pellets there will be some attrition and the particles or fines of catalyst and of deposit rubbed from the surface of the catalyst will fall through apertured support 17 to the bottom of lower part 15 of the muffler casing. As shown, part 15 has a downwardly slanting bottom wall, and a capped outlet pipe 21 at its lowest point permits removal of accumulated fines, so that any valuable substances therein, such as the catalytic metals for effecting oxidation, can be recovered. The reactant fumes freed of odorous and poisonous components by the oxidizing reaction escape to atmosphere through outlet pipe 22 at the end of the casing opposite particle withdrawal pipe 21.

Fig. 2 shows a two stage converter. In this form of the invention a conduit 30 provided with venturi 31 conducts the oxidizable material mingled with air to a first catalytic zone provided by a converter section made up of a flanged upper part 32 and flanged lower part 33, with a catalyst chamber clamped between the flanges of such parts and formed by a dished apertured grid or lower support 34 and a flat upper grid 35, the general construction of the catalyst chamber being shown in perspective in Fig. 4. The flanged portions of converter parts 32 and 33, as well as the flanged portions of grids 34 and 35, will be suitably apertured as indicated in Fig. 4 for the insertion of bolts or other suitable securing means to hold these parts in assembled relation. Catalyst 18 is fed to the catalyst chamber from a single hopper 36, having its lower open end 36a projecting slightly through and below upper grid 35, while its upper end extends through and above upper part 32 of the catalyst section and is provided with a closure cap 36b. Vibrating movement of the converter causes catalyst 18 supplied by hopper 36 to spread across and form a layer of substantially uniform thickness on apertured support 34 as indicated. Partially oxidized products from the first converter section are conducted by conduit 37 into a second converter section generally similar to the first section but of greater longitudinal extent, this second section being made up of an upper flanged part 38 and lower flanged part 39, a catalyst chamber of somewhat greater depth than the one shown in the first zone being clamped between the flanged portions of the converter section parts and comprised like the first chamber of a lower dished apertured support or grid 40 and an upper apertured grid 41. A series of hoppers 42 conforming in general to those previously described are provided to maintain a layer of catalyst of substantially uniform thickness between grids 40 and 41, the outlet ends 42a projecting through and slightly below upper grid 41. Particles and fines resulting from abrasion in both zones of this two stage converter eventually make their way to the bottom of the lower part 39 of the second section and may be conducted by gravity or carried by the stream of oxidized products into a separator 44 of any suitable or known type, such as a centrifugal separator, whence the solid particles may be removed continuously or intermittently through a pipe 45, while the oxidized products such as odorless and non-poisonous engine fumes pass to atmosphere through a conduit 46. When such products are at an undesirably high temperature they may be cooled by mingling them with fresh air which may be admitted into the conduit through any suitable means such as a venturi 47.

For the three stage converter shown in Fig. 5 the reactants, such as engine exhaust fumes, are conducted by conduit 50 and have mingled therewith fresh air supplied by venturi 51, the mixture passing in series through three catalytic zones arranged in cascade. Each zone is formed by a casing made up of a flanged upper part 52 and a flanged lower part 53, these parts being shown in plan in Figs. 6 and 7 respectively. Each upper part provides an inlet aperture 52a for reactants and an opening 52b through which extends a hopper 54 (Fig. 5) whose lower end projects a suitable distance within its catalyst chamber and whose upper end is closed by cap 54b. Each lower part 53 has an opening 53a for the discharge of reaction products. The parts 52 and 53 making up each zone are bolted together as shown in Fig. 5 and between such parts of each zone is clamped a catalyst chamber of the general type illustrated in Fig. 4, but shaped to conform to and to fit the flanged contour of the parts. The catalyst chamber for the first zone consists of a lower dished and apertured support or grid 55 and an upper flat grid 56. The catalyst chamber provided by these parts is relatively shallow, as for example of the order of one-half of an inch, to effect preliminary oxidation of the reactants or fumes fed thereto by pipe 50. The catalyst chamber of the second zone provided by lower dished and apertured support 57 and upper apertured grid 58 is of slightly greater depth, as of the order of three-quarters of an inch, while the catalyst chamber of the third zone provided by lower dished and apertured support 59 and upper apertured grid 60 is of still greater depth, as about one inch. While no catalyst is shown in Fig. 5, it is apparent that the reactants sent to this converter by conduit 50 are subjected to progressively increased depths of catalyst as they progress from stage to stage, thereby to effect complete and effective oxidation of all burnable components in the fumes leaving the last stage. The thus cleaned fumes discharged through outlet opening 53a of the final stage, along with any solid particles of catalyst and deposit dislodged from the catalyst of all three stages, issue from such third stage into an outlet conduit 62 which has a downwardly extending portion 62a forming a trap, the lower open end of which is closed by removable cap 63. Solid particles are diverted into this trap by one or more baffles 62b within outlet conduit 62, such baffles intercepting the solid particles to separate them from the gaseous products of the reaction.

Figure 9:
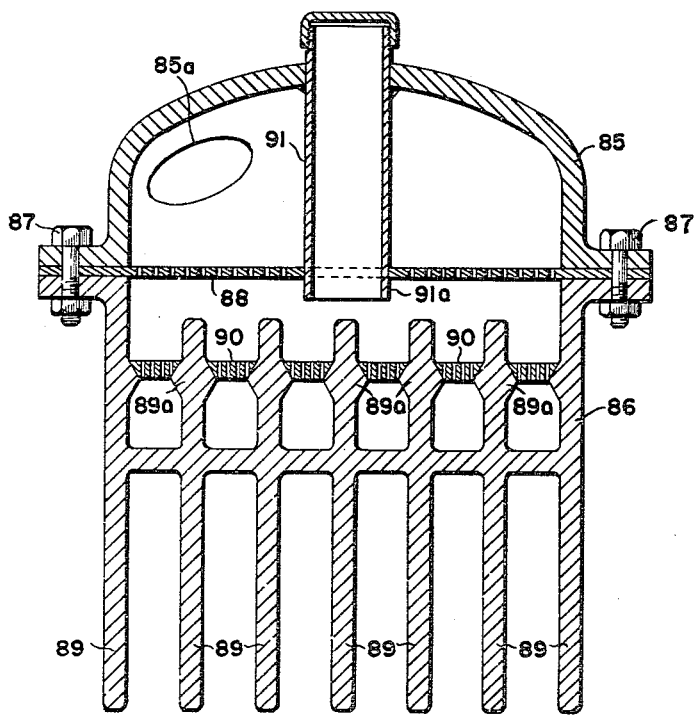
Fig. 9 is a transverse vertical sectional view of still another modified converter provided with fins.

When large quantities of heat are liberated by the reaction, as when there is much burnable material in fumes to be oxidized or when the catalysts utilized operate at high temperatures, dissipation of the heat sometimes involves a problem. As indicated in the forms of apparatus shown in Figs. 1, 2 and 5, the surface areas of the converters exposed to the air are quite extensive. Dissipation of heat can be increased by providing ribs on the exterior of the converter parts or by otherwise extending the surface area. When such minor modifications do not remove sufficient heat, fins may be provided extending into the catalyst chamber itself. The modifications illustrated in Figs. 8 and 9 show desirable ways for effective removal of heat through the use of fins. In Fig. 8 the converter illustrated is formed of an upwardly dished part 65 of heavy metal and a downwardly dished lower part 66. Both parts are flanged to permit them to be secured together, as by bolts 67. Upper part 65 has an inlet for reactants at 68, and lower part 66 has an outlet for reaction products at 69. A heavy metal plate 70 is secured in lower part 66 in fixed position by welding or otherwise as indicated, and this plate has a series of rather large apertures 71 therethrough which are covered at both ends by screens 72. Plate 70 serves as the apertured support for the layer of catalyst (not shown) and forms the bottom wall of the catalyst chamber. In spaced parallel relation with plate 70 and within upper part 65 is mounted a screen 73 to define the top of the catalyst chamber and through this screen projects the outlet ends 74a of a series of hoppers 74, each of which has a closure cap 74b at its top. For the dissipation of heat a series of fins 75 are provided having enlarged heads 75a which rest upon plate 70, the fins extending through said plate and through and beyond lower converter member 66 as shown, so that heat from the very interior of the layer of catalyst is conducted directly to the exterior of the converter. As clearly shown the enlarged heads 75a of fins 75 extend only about half the depth of the catalyst chamber defined by supporting plates 70 and screen 73, and such heads are well below the outlets 74a of hoppers 74. This permits the catalyst to flow, when the converter is subjected to vibratory movement, over such enlarged heads 75a to spread a layer of catalyst entirely across apertured support 70 without completely filling the catalyst chamber, the projection of the hopper outlets 74a below screen 73 determining the general level of the layer of discrete catalyst within the catalyst chamber. Since fins 75 extend transverse to the movement of fluid below support plate 70, each fin has one or more apertures 75b to permit free movement of reaction products to outlet 69.

In the modification of the invention illustrated in Fig. 9, a transverse sectional view of a converter is shown in which the fins are integral with one of the complementary parts which are secured together to form the converter. In this view the upper part of the converter is indicated at 85 with an inlet at 85a, the lower part at 86, both parts being flanged and secured together by bolts 87, an apertured plate or grid 88 forming the upper wall of the catalyst chamber being clamped between the two parts. Long heat dissipating fins 89 are integral with lower part 86, and these fins extend above as well as below the bottom wall of the converter. The portions of the fins above the bottom wall of part 56 are shorter than their projections below it, and at a point intermediary their length are enlarged laterally at 89a. Upon such lateral enlargements rest apertured plates or grids 90 to form the support for the layer of catalyst (not shown) which will be fed into the space between supports 90 and grid 88 from a hopper 91 whose open lower end 91a extends through grid 88 and projects therebelow a suitable predetermined distance, but leaving sufficient space between it and the upper ends of fins 89 to permit the layer of catalyst to spread entirely across the converter. Apertured supports 90 as illustrated are of porcelain fired at high temperatures and hence capable of supporting any temperatures reached within the catalyst chamber. As in the embodiment shown in Fig. 8, the upper ends of fins 89 of Fig. 9 extend upwardly approximately half the distance between supporting grids 90 and upper grid 88 of the catalyst chamber. In this form of the invention movement of the reaction products will be longitudinally of the fins, and no apertures in the latter will be required.

After any of the converters illustrative of the present invention has been assembled and mounted, the hoppers (such as 19, 36, 42, 54, 74 or 91) will be filled with catalyst in discrete form and preferably of substantially uniform size. The converter should then be tapped with a bar or hammer sufficiently to cause the catalyst to flow out of the open ends of the hoppers and spread in a uniform layer completely across each catalyst chamber. In the case of converters such as shown in Figs. 8 and 9 having fins extending upwardly into the catalyst chamber, vigorous tapping will be required to make sure that the catalyst has passed over the tops of all of the fins and covered the entire bottom surface of each catalyst chamber to a substantially uniform depth. Two or more fillings of the hoppers may be required depending upon their number and size. The hoppers should also be completely full when the converter is put into operation so that losses of catalyst from attrition will be automatically replenished for a considerable period. During operation there should be sufficient vibratory motion of the converter to cause the individual catalyst pieces or pellets to dance or to be in a state of constant agitation or vibration relative to each other and to the surroundings so that reactant fluids can pass freely over and around them with a minimum of back pressure and so that surface deposits on the catalyst will be brushed off or rubbed away. When the apparatus is utilized to clean the exhaust fumes of an engine, the operation of the latter will usually provide the required amount of agitation or vibration. For other catalytic operations, oxidizing or otherwise, it may be necessary to provide special mechanical means to vibrate the converter in order that the pieces of catalyst making up the catalytic layers shall be kept in motion sufficiently to present active surfaces for promoting the desired reaction in a continuous manner.

The catalyst should have sufficient compactness and strength to withstand the vibrating, rubbing and rolling action for a long period without undue loss from abrasion. The catalyst pieces should be reasonably uniform in size; extruded, molded, or pelleted catalysts are preferred. Catalysts in the form of cylindrical plugs or spheres are suitable, spheres being preferred. However, plugs soon have their edges worn away or knocked off and hence wear to oval or round shape. Individual catalyst pieces or pellets of 2 to 6 mm. size are suitable for use in catalyst chambers up to about two inches in depth for oxidizing burnable material in the exhaust fumes of internal combustion engines. The depth of the catalyst chambers such as those illustrated is so adjusted with reference to the size of catalyst pieces or pellets and by projection of the outlet of the hopper therein that there is always an empty space beneath the top grid of the chamber, the empty space being preferably of the order of $\frac{1}{32}$ of an inch to about $\frac{1}{8}$ of an inch. These factors above noted combine to make it quite impossible for the mass of catalyst pieces or pellets to completely fill or to pack solidly within the catalyst chamber so long as the latter is maintained in horizontal or substantially horizontal position. It is essential that there be some free space at the top of the catalyst chamber so that the individual pieces of catalyst can move and rub over one another. Any suitable or desired catalysts, if in discrete or pellet form, may be utilized. For oxidizing reactions a highly desirable catalyst is provided by impregnating pellets or molded pieces of alumina (catalyst grade) with finely divided oxidizing catalyst such as elements of the platinum group of the periodic table, or silver, or copper, etc. By trapping or segregating the fines as indicated in Figs. 1, 2 and 5 such valuable elements can be recovered. Suitable catalysts for promoting other reactions will be apparent to those skilled in the art of catalysis.

When it is not feasible or desirable to effect complete conversion of reactants in a single zone of catalyst, stage converters such as illustrated in Figs. 2 and 5 may be utilized, since they permit better control of operating temperatures, as well as partial cooling between stages when necessary or desirable, as by heat exchangers or by addition of cool diluents.

While the invention has been herein disclosed and described with special reference to oxidizing reactions, specifically for oxidation of burnable components in exhaust fumes, it will be apparent to those skilled in the art of catalysis that it has wide application to reactions in which the surface of the catalyst becomes fouled by solid particles of extraneous material, such for example as dust, metal fines, products of corrosion, solids formed during the reaction, etc. It is to be further understood that in order to make clear the process as well as the apparatus aspects of the invention certain preferred forms of apparatus have been shown. However, the invention is not limited to the specific details shown by way of illustration but includes all changes, modifications and adaptations within the scope of the appended claims.

We claim as our invention:

1. Catalytic apparatus adapted for attachment to automotive vehicles and the like for elimination of obnoxious components of exhaust gases therefrom and including a bed of catalyst particles which tend to become coated with foreign matter during use and thus lose their activity, said apparatus including a housing for attachment to said vehicle or the like and subject to vibration transmitted from said vehicle thereto, a container for said catalyst particles mounted within said housing and comprised of a pair of spaced apart, parallel, foraminous members extending across said housing and defining between them a relatively shallow space for receiving a layer of catalyst particles, means connecting said housing to the exhaust manifold of the vehicle engine whereby exhaust gases therefrom pass through said foraminous members in contact with said catalyst particles, at least one catalyst supply hopper extending substantially vertically from and opening into said catalyst containing means, whereby on vibration of said housing during operation of said vehicle, catalyst particles flow by gravity from said hopper into said catalyst containing means to replace catalyst lost from said container by attrition and thus to maintain a substantially uniform level of catalyst in said container, flow restricting means at the discharge end of said hopper for restricting the flow of said catalyst particles into said container, said flow restricting means being arranged to prevent said particles from rising above a predetermined level in said container, thus preventing said container from becoming tightly packed with catalyst particles and thereby assuring movement of said catalyst particles within said container at all times in response to vibration transmitted thereto from the vehicle so as to free said particles from foreign deposits as they accumulate.

2. Apparatus in accordance with claim 1 including a plurality of interconnected sections arranged in series, each section including a catalyst container extending across the path of movement of said exhaust gases, whereby said exhaust gases flow in series through said catalyst containers in contact with the catalyst particles contained therein.

3. Apparatus in accordance with claim 1 having heat dissipating fins extending within said catalyst container in contact with catalyst particles contained therein and adapted to dissipate heat from the bed of catalyst particles to the exterior of said housing.

4. An apparatus constructed in accordance with claim 1 which includes means for collecting catalyst fines resulting from catalyst attrition during vibration of the container which escape the catalyst container into the stream of outflowing exhaust gases.

5. Catalytic apparatus adapted for attachment to automotive vehicles and the like for elimination of obnoxious components of exhaust gases therefrom and including a bed of catalyst particles which tend to become coated with foreign material during use and thus lose their activity, said apparatus including a housing for attachment to said vehicle or the like and subject to vibration transmitted from said vehicle thereto, a container for said catalyst particles mounted within said housing and comprised of upper and lower foraminous members disposed in spaced-apart parallel arrangement and extending across said housing and defining between them a relatively shallow space for receiving a layer of catalyst particles, means connecting said housing to the exhaust manifold of the vehicle engine whereby exhaust gases therefrom pass through said foraminous members in contact with said catalyst particles, at least one catalyst supply hopper extending substantially vertically from and opening into said catalyst containing means whereby on vibration of said housing during operation of said vehicle catalyst particles flow by gravity from said hopper into catalyst containing means to replace catalyst lost from said container by attrition thus maintaining a substantially uniform level of catalyst in said container, flow restricting means at the discharge end of said hopper for restricting the flow of said catalyst particles into said container, said flow restricting means being formed by portions of the discharge end of said supply hopper projecting downwardly through the upper of said foraminous members and discharging into said container at a predetermined level below said upper member whereby catalyst particles discharging from said hopper into said container are prevented from rising above said predetermined level by said projecting portions, thus preventing said container from becoming tightly packed with catalyst particles and thereby assuring movement of said catalyst particles within said container at all times in response to vibration transmitted thereto from the vehicle so as to free said particles from foreign deposits as they accumulate.

References Cited in the file of this patent

UNITED STATES PATENTS

| Re. 12,759 | Eschellmann et al. | Mar. 10, 1908 |
|---|---|---|
| 461,303 | Andrews | Oct. 13, 1891 |
| 1,522,111 | Frank-Philipson | Jan. 6, 1925 |
| 1,836,166 | Hechenbleikner et al. | Dec. 15, 1931 |
| 1,840,186 | Courtney et al. | Jan. 5, 1932 |
| 1,843,999 | White | Feb. 9, 1932 |
| 2,209,040 | Simpson et al. | July 23, 1940 |
| 2,284,584 | Martin | May 26, 1942 |
| 2,312,006 | Thiele | Feb. 23, 1943 |
| 2,330,767 | Welty | Sept. 28, 1943 |
| 2,433,670 | Kropp | Dec. 30, 1947 |
| 2,504,215 | Montgomery et al. | Apr. 18, 1950 |
| 2,534,092 | Wilde | Dec. 12, 1950 |

FOREIGN PATENTS

| 754,690 | France | Nov. 10, 1933 |
|---|---|---|
| 439,766 | Great Britain | Dec. 13, 1935 |